US012430982B2

(12) United States Patent
Kania et al.

(10) Patent No.: US 12,430,982 B2
(45) **Date of Patent: *Sep. 30, 2025**

(54) SYSTEMS AND METHOD FOR METAMORPHIC REEL GAME FEATURES

(71) Applicant: Aristocrat Technologies Australia Pty Limited, North Ryde (AU)

(72) Inventors: Scott Kania, Reno, NV (US); Michael P. Casey, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,546

(22) Filed: Dec. 4, 2023

(65) Prior Publication Data

US 2024/0104997 A1 Mar. 28, 2024

Related U.S. Application Data

(63) Continuation of application No. 17/571,113, filed on Jan. 7, 2022, now Pat. No. 11,875,633, which is a continuation of application No. 16/825,935, filed on Mar. 20, 2020, now Pat. No. 11,222,501, which is a continuation of application No. 15/981,596, filed on May 16, 2018, now Pat. No. 10,614,655.

(51) Int. Cl.
*G07F 17/32* (2006.01)
*G07F 17/34* (2006.01)

(52) U.S. Cl.
CPC ...... *G07F 17/3213* (2013.01); *G07F 17/3244* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 4,889,339 | A | 12/1989 | Okada |
| 6,306,034 | B1 | 10/2001 | Sakamoto |
| 7,402,102 | B2 | 7/2008 | Marks |

(Continued)

OTHER PUBLICATIONS

Australian Examination Report No. 1 issued in App. No AU2019203082, dated Feb. 23, 2024, 3 pages.

(Continued)

*Primary Examiner* — Seng H Lim
(74) *Attorney, Agent, or Firm* — Armstrong Teasdale LLP

(57) ABSTRACT

A gaming system includes a main display configured to display a wagering game comprising a plurality of virtual spinnable reels having a plurality of adjacent game symbol positions. A game controller is communicatively coupled to the display, and a computer-readable storage medium. The game controller is configured to initiate a first round of play of a base game causing a simulated spinning of the spinnable reels, change the base game to a metamorphic reel game based on a triggering condition of a special symbol landing on a stopped reel. At least one morphed reel is created from at least two of the spinnable reels. At least one reel is replaced with the morphed reel in the metamorphic reel game. A game outcome is determined based on paytable and a reduced number of reels that includes the morphed reel. Credit is awarded to the player based on the game outcome.

20 Claims, 7 Drawing Sheets

(56) References Cited

U.S. PATENT DOCUMENTS

| | | | | |
|---|---|---|---|---|
| 8,333,649 | B2 | 12/2012 | Marks | |
| 8,632,390 | B2 | 1/2014 | Marks | |
| 9,262,894 | B2 | 2/2016 | Marks | |
| 9,569,935 | B2 * | 2/2017 | Berman | G07F 17/3293 |
| 9,659,463 | B2 | 5/2017 | Carter | |
| 9,953,482 | B2 | 4/2018 | Montenegro | |
| 9,993,721 | B2 | 6/2018 | Palermo | |
| 10,157,516 | B2 | 12/2018 | Hendricks | |
| 10,546,448 | B2 | 1/2020 | Mizue | |
| 2004/0266510 | A1 | 12/2004 | Kojima | |
| 2006/0189377 | A1 | 8/2006 | Gomez | |
| 2008/0119260 | A1 | 5/2008 | Nores | |
| 2008/0146319 | A1 * | 6/2008 | Yoshizawa | G07F 17/3265 463/21 |
| 2008/0280673 | A1 | 11/2008 | Marks | |
| 2009/0104969 | A1 | 4/2009 | Paulsen | |
| 2009/0221352 | A1 | 9/2009 | Nakano | |
| 2009/0291739 | A1 | 11/2009 | Tsukahara | |
| 2009/0298573 | A1 | 12/2009 | Bramble | |
| 2011/0201406 | A1 | 8/2011 | Jaffe | |
| 2012/0115567 | A1 | 5/2012 | Huang | |
| 2012/0309488 | A1 | 12/2012 | Yoshikawa | |
| 2012/0322532 | A1 | 12/2012 | Nauman | |
| 2013/0095906 | A1 | 4/2013 | Marks | |
| 2014/0087830 | A1 * | 3/2014 | Gobe | G07F 17/323 463/20 |
| 2014/0106851 | A1 | 4/2014 | Marks | |
| 2014/0274288 | A1 | 9/2014 | Hornik | |
| 2015/0011291 | A1 | 1/2015 | Nauman | |
| 2015/0018071 | A1 | 1/2015 | Elias | |
| 2015/0105136 | A1 * | 4/2015 | Delekta | G07F 17/34 463/20 |
| 2015/0105138 | A1 | 4/2015 | Delekta | |
| 2015/0170462 | A1 | 6/2015 | Berman | |
| 2015/0287269 | A1 * | 10/2015 | Berman | G07F 17/326 463/20 |
| 2015/0348359 | A1 | 12/2015 | Comeau | |
| 2015/0356833 | A1 | 12/2015 | Aoki | |
| 2016/0055705 | A1 | 2/2016 | Elias | |
| 2016/0140798 | A1 | 5/2016 | Marks | |
| 2016/0292957 | A1 | 10/2016 | Inamura | |
| 2016/0364944 | A1 | 12/2016 | Elias | |
| 2017/0061729 | A1 | 3/2017 | Delekta | |
| 2018/0061186 | A1 * | 3/2018 | Berman | G07F 17/3265 |
| 2018/0130288 | A1 * | 5/2018 | Lamb | G07F 17/3262 |
| 2019/0122487 | A1 | 4/2019 | Lamb | |
| 2019/0355206 | A1 | 11/2019 | Kania | |
| 2020/0074790 | A1 | 3/2020 | Oyama | |
| 2020/0202664 | A1 | 6/2020 | Mizue | |

OTHER PUBLICATIONS

Office Action dated May 24, 2021 for U.S. Appl. No. 16/825,935 (pp. 1-13).

Office Action dated May 25, 2021 for U.S. Appl. No. 16/826,006 (pp. 1-7).

Office Action (Notice of Allowance and Fees Due (PTOL-85)) dated Aug. 2, 2021 for U.S. Appl. No. 16/826,006 (pp. 1-5).

Office Action (Notice of Allowance and Fees Due (PTOL-85)) dated Sep. 7, 2021 for U.S. Appl. No. 16/825,935 (pp. 1-5).

Office Action (Non-Final Rejection) dated Mar. 22, 2023 for U.S. Appl. No. 17/571,113 (pp. 1-13).

Office Action (Final Rejection) dated Jul. 27, 2023 for U.S. Appl. No. 17/571,113 (pp. 1-6).

Office Action (Notice of Allowance and Fees Due (PTOL-85)) dated Oct. 12, 2023 for U.S. Appl. No. 17/571,113 (pp. 1-5).

* cited by examiner

SYSTEMS AND METHOD FOR METAMORPHIC REEL GAME FEATURES

CROSS-REFERENCE TO RELATED APPLICATION

The present application is continuation of U.S. patent application Ser. No. 17/571,113, filed Jan. 7, 2022, which is a continuation of U.S. patent application Ser. No. 16/825,935, filed Mar. 20, 2020, and now granted as U.S. Pat. No. 11,222,501, which is a continuation of U.S. patent application Ser. No. 15/981,596, filed May 16, 2018, and now granted as U.S. Pat. No. 10,614,655, each of which is herein incorporated by reference in their entireties.

TECHNICAL FIELD

The field of disclosure relates generally to electronic gaming, and more particularly to systems and methods for providing a metamorphic reel game feature in electronic games.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is provided. The electronic gaming system includes a main display configured to display a wagering game comprising a plurality of adjacent spinnable reels, each spinnable reel being virtual and having a plurality of adjacent game symbol positions. The electronic gaming system also includes a player input interface configured to receive a player input. The electronic gaming system further includes a random number generator. The electronic gaming system also includes a credit input mechanism. The credit input mechanism includes at least one of a ticket reader, a bill acceptor, and a coin input mechanism. The credit input mechanism is configured to receive a physical item representing a monetary value for establishing a credit balance used for a credit wager. The credit wager initiates play of a base game. The electronic gaming system further includes a tangible, non-transitory, computer-readable storage medium having instructions stored thereon. The electronic gaming system also includes a game controller communicatively coupled to the display, the player input interface, the random number generator, the credit input mechanism, and the tangible non-transitory computer-readable storage medium. Upon execution of the instructions, the game controller is configured to initiate play of the base game upon receipt of the credit wager and a player input from the player input interface, thereby causing a simulated spinning of the plurality of adjacent spinnable reels. The game controller is also configured to change the base game to a metamorphic reel game. The game controller is further configured to create a morphed reel based on symbols included in a first and a second reel of the plurality of adjacent spinnable reels. The game controller is also configured to replace the first and the second reel with the morphed reel in the metamorphic reel game during the simulated spinning The game controller is further configured to determine a metamorphic reel game outcome based on a metamorphic reel game paytable and a reduced number of reels including the morphed reel. The game controller is also configured to award credit to the player based on the metamorphic reel game outcome.

In another aspect, a method of electronic gaming is provided. The method is implemented using a gaming system. The gaming system includes a main display configured to display a wagering game. The gaming system also includes a player input interface. The gaming system further includes a credit input mechanism. The credit input mechanism includes at least one of a ticket reader, a bill validator, and a coin input mechanism. The credit input mechanism is configured to establish a credit balance that is increasable and decreasable based on wagering activity. The gaming system also includes one or more tangible, non-transitory, computer-readable memory devices. The gaming system further includes one or more processors communicatively coupled to the one or more memory devices. The method includes initiating play of a base game upon receipt of a credit wager and a player input from the player input interface, thereby causing a simulated spinning of a plurality of adjacent spinnable reels. The base game includes the plurality of adjacent spinnable reels. Each reel has a plurality of circumferentially adjacent game symbol positions. The base game uses a base game paytable. The method further includes spinning the reels. The method also includes initiating a metamorphic reel game, the metamorphic reel game using a metamorphic reel game paytable. The method further includes morphing a plurality of reels into a lesser number of reels during a simulated spinning by combining symbols from a first reel and symbols from a second reel to form a single resultant reel having the combined symbols. The method also includes stopping the reels in an order specified by the initiating. The method further includes determining a metamorphic reel game outcome using a metamorphic reel game paytable and the single morphed reel. The method also includes awarding credit to the player based on the determined metamorphic reel game outcome.

In yet another aspect, one or more non-transitory computer-readable storage media having computer-executable instructions embodied thereon is provided. When executed by at least one processor, the computer-executable instructions cause the processor to initiate a base slot game having a plurality of slot reels comprising adjacent game symbol locations. The instructions also cause the processor to randomly initiate a metamorphic reel game prior to determining a base slot game outcome. The instructions further cause the processor to morph at least two slot reels of the plurality of slot reels into a single morphed slot reel during a simulated spinning The instructions also cause the processor to determine a metamorphic reel game outcome based on the single morphed slot reel and the remaining unmorphed slot reels. The instructions further cause the processor to award credit to a player based on a metamorphic reel game paytable. The metamorphic reel game paytable is different than a base slot game paytable.

DETAILED DESCRIPTION

Embodiments of the gaming systems, gaming devices, and methods described herein provide an electronic gaming machine or gaming device that includes a main display on which a wagering game is displayed during game play. The wagering game is of the slot-type game that includes a plurality of adjacent spinnable reels (typically five or three reels) that each have a plurality of game symbol positions that are adjacent about the circumference of the respective reel. The reels and game symbol positions form a grid on the main display. The electronic gaming device includes a controller that is operable to initiate play of the base game upon receipt of a credit wager and a player input from a player input interface. The controller selects a symbol from a set of symbols for each of the plurality of adjacent game symbol positions. Typically only one symbol is positioned within each game symbol position, however a plurality of game symbols may be positioned inside a single game symbol position. For example, by overlaying two or more game symbols one on top of each other, combining two or more game symbols into a new symbol, positioning game symbols side-by-side in a single game symbol position, or combinations thereof. Each symbol may have one of a plurality of associated ranks wherein each rank influences a game outcome differently than each other rank. The controller spins the reels, receives an output from the random number generator, and stops the reels in an order specified by the received output.

In some exemplary embodiments, if a rightmost or leftmost reel stops first, the controller determines a base game outcome based on a base game pay table and a payline that starts with the reel that stopped first. If an interior reel between the rightmost and leftmost reels stops first, the controller enters a metamorphic reel game. In other words, the game controller morphs a plurality of reels of the plurality of adjacent spinnable reels into a single reel. For example, a base game having five reels may have two reels morphed together into a single reel to form a four reel game, or may have four reels morphed into two reels forming a three reel game. Other combinations of morphing reels are implemented based on the output from the random number generator. The controller determines an outcome of the metamorphic reel game using a metamorphic reel game paytable and the morphed reels, and award credit to the player based on the determined metamorphic reel game outcome.

Figure 1:
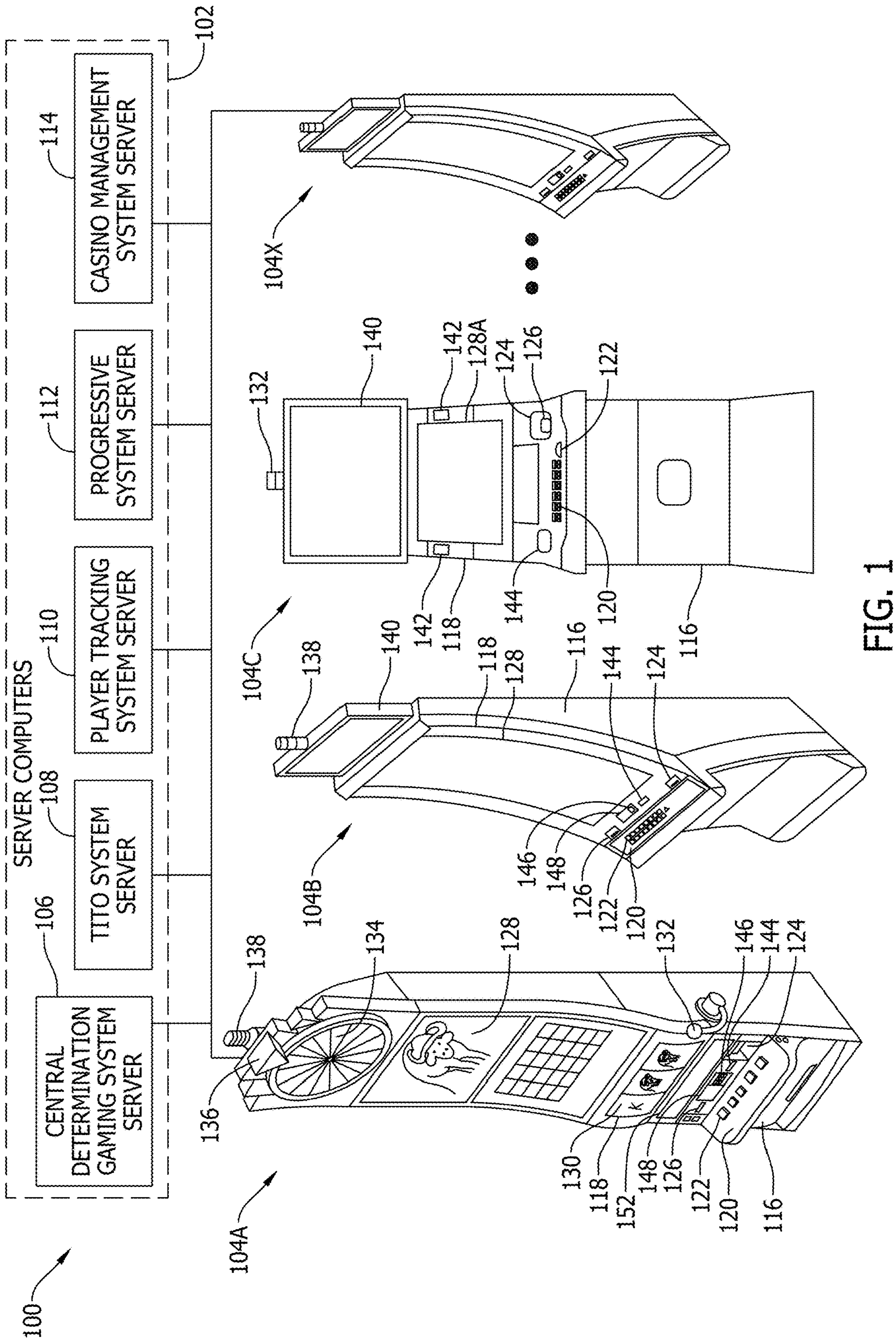
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a service door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of spinnable reels 130 with various symbols displayed on them. Reels 130 may be physically mechanical reels or may be electronic representations of reels 130 displayed on a screen of gaming display area 118. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by the gaming device or by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of the cabinet which may be used to initiate game play.

Figure 2:
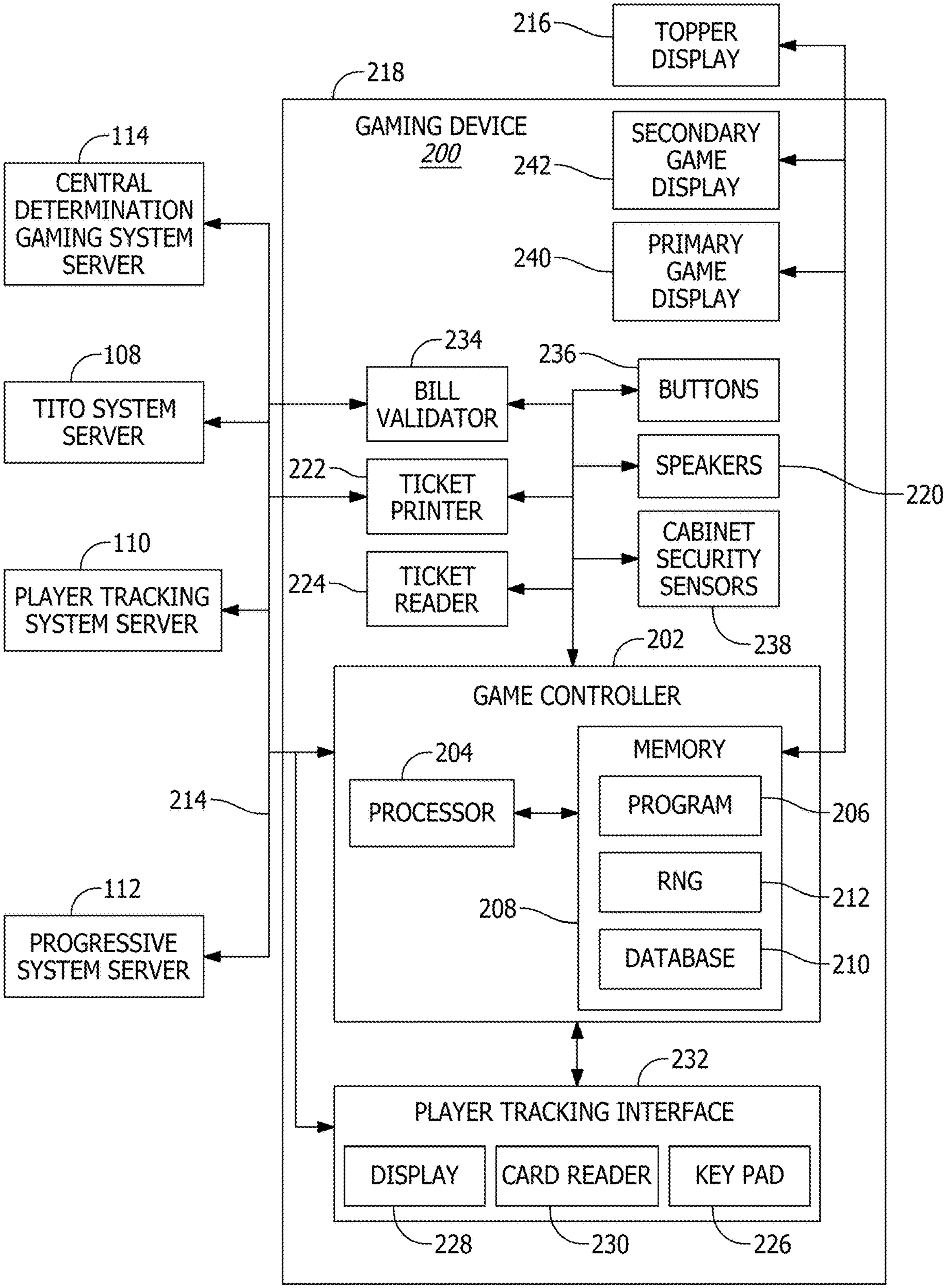
FIG. 2 is a block diagram showing various functional elements of an exemplary EGM.

Many or all the above described components can be controlled by circuitry (e.g., a gaming controller) housed inside the cabinet of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a cabinet including a service door 116 which opens to provide access to the interior of the gaming device 104B. The service door 116 is typically used by service personnel to refill the ticket-out printer 126 and collect bills and tickets inserted into the bill validator 124. The service door 116 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

In various embodiments, memory 208 is embodied on one or more non-transitory computer-readable storage media having computer-executable instructions embodied thereon. When executed by at least one processor 204, the computer-executable instructions cause the one or more processors 204 to initiate a base slot game having a plurality of slot reels, each including adjacent game symbol locations, randomly initiate a metamorphic reel game prior to determining a base slot game outcome, and morph at least two slot reels of the plurality of slot reels into a single morphed slot reel. For example, the computer-executable instructions may further cause the one or more processors 204 to morph five slot reels of the plurality of slot reels into two morphed slot reels and a single unmorphed slot reel. The computer-executable instructions cause the one or more processors 204 to determine a metamorphic reel game outcome based on the morphed slot reels and the remaining unmorphed slot reels and award credit to a player based on a metamorphic reel game paytable that is different than a base slot game paytable. The computer-executable instructions may further cause the processor to morph at least two slot reels of the plurality of slot reels into a single morphed slot reel by joining symbols that are laterally aligned in adjacent morphing reels into a mega-symbol, the mega-symbol having at least one of a different visual appearance than other symbols displayed in the plurality of slot reels, a different rank than other symbols displayed in the plurality of slot reels, modifies the metamorphic reel game paytable, replaces the metamorphic reel game paytable with a second metamorphic reel game paytable, and combinations thereof.

Figure 3:
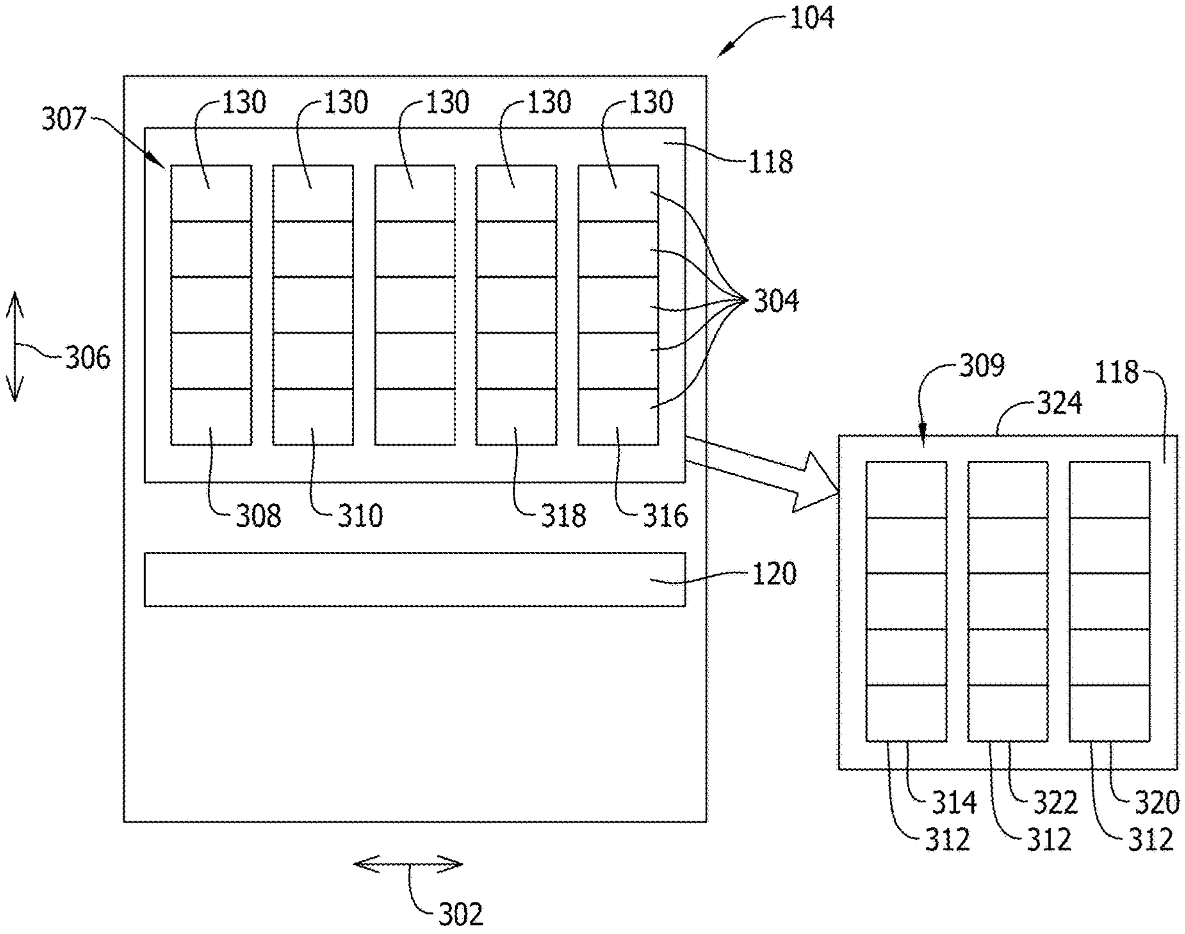
FIG. 3 is a block diagram of the electronic gaming device shown in FIG. 1 including a metamorphic reel feature.

FIG. 3 is a block diagram of electronic gaming device 104 including a metamorphic reel feature. In the example embodiment, electronic gaming device 104 includes gaming display area 118 configured to display a wagering game including a plurality of spinnable reels 130 adjacent to each other in a lateral direction 302, each spinnable reel 130 has a plurality of game symbol positions 304 adjacent to each other in a circumferential direction 306. A base game instance 307 of gaming display area 118 illustrates a five reel base game and a metamorphic game instance 309 illustrates a three reel metamorphic reel game after the morphing process is completed.

Electronic gaming device 104 also includes a player input interface or button deck 120 configured to receive a player input, a random number generator 212 (shown in FIG. 2) configured to facilitate game play, with respect to game outcomes and game events, such as, initiation of a bonus games, such as, but not limited to a metamorphic reel game, described in detail below. Electronic gaming device 104 further includes a credit input mechanism including at least one of a ticket reader 224, a bill acceptor/validator 234, and a coin input mechanism, the credit input mechanism is configured to receive a physical item or a wireless signal representing a monetary value for establishing a credit balance used for a credit wager that is used to initiate play of a base game. Electronic gaming device 104 also includes a tangible, non-transitory, computer-readable storage medium, for example, memory 208 (shown in FIG. 2) having instructions stored thereon. Game controller 202 is communicatively coupled to gaming display area 118, main display 128, button deck 120, random number generator 212, credit input mechanisms ticket reader 224, a bill acceptor/validator 234, and memory 208.

Game controller 202, upon execution of the instructions, is configured to initiate play of the base game upon receipt of the credit wager and a player input from the player input interface or button deck 120. Game controller 202 selects a symbol from a set of symbols for each of the plurality of adjacent game symbol positions 304. In some embodiments, each symbol has one of a plurality of associated ranks, each rank influences a game outcome differently than each other rank. Game controller 202 is configured to spin reels 130, receive an output from random number generator 212, and to stop reels 130 in an order specified by the received output.

If a rightmost or leftmost reel 130 stops first, electronic gaming device 104 determines a base game outcome based on a base game paytable and a payline that starts with the reel that stopped first. For example, if the rightmost reel 130 stops first, the outcome is determined based on a right to left payline in the base game paytable. If the leftmost reel 130 stops first, the outcome is determined based on a left to right payline in the base game paytable.

If an interior reel between the rightmost and leftmost reels stops first, game controller 202 triggers a metamorphic reel game wherein the game controller 202 morphs a plurality of reels 130 of the plurality of adjacent spinnable reels 130 into a single morphed reel 312. For example, three reels 130 may be morphed into one or two reels 312. In one embodiment, the leftmost reel 308 is morphed into a single reel 314 with the reel immediately adjacent to the leftmost reel, reel 310. Also in this embodiment, the rightmost reel 316 is morphed with the reel 318 immediately adjacent rightmost reel 316 to form a rightmost morphed reel 320. Together with the morphed leftmost reel 314 and a center reel 322 that has not been morphed, a three reel game 324 is formed. Accordingly, a three reel game paytable is used to award a winning outcome of the three reel game 324. The paylines of the three reel game 324 are different than (e.g., less in number) the paylines available in the five reel game. In various embodiments, the paylines of the three reel game 324 pay higher awards than the paylines of a five reel game. After the morphed reels 314, 320 are formed, game controller 202 determines the metamorphic reel game outcome using the metamorphic reel game paytable, unmorphed reel 322, and morphed reels 314 and 320, and awards credit to the player based on the determined metamorphic reel game outcome.

In some embodiments, when two are more adjacent reels 130 are to be morphed together, symbol rank of the initial symbols on the pre-morphed reels 130 affects the morphing results. More specifically, and for example, the game controller 202 identifies the adjacent reels 308 and 310 for morphing. For each symbol position on reels 308, 310 (e.g., for each row), game controller 202 compares laterally adjacent symbols (e.g., one from each reel 308, 310 in that row) to determine a single morphed symbol to be used in the associated symbol position on the morphed reel 314. More specifically, game controller 202 selects the highest ranking symbol from the adjacent symbols and uses that highest ranking symbol on the morphed reel 314. For example, when constructing morphed reel 314, game controller 202 may morph an "7" symbol from reel 308 and a laterally adjacent "diamond" symbol from reel 310 into a "diamond" symbol on the morphed reel 314 because "diamond" is a higher-ranked symbol than "7." In other words, for each set of laterally adjacent symbols on the pre-morphed reels 130, game controller 202 identifies the highest-ranked symbol of the set and places that highest-ranking symbol into the associated symbol position on the morphed reel 312. As such, the resulting morphed reel 314 is likely to have an increased average symbol rank, and thus is more exciting to the player.

The term "replacing" may be used herein, in some contexts, to describe an operation involving selecting a symbol to populate onto a morphed reel (e.g., morphed reel 312). For example, two laterally adjacent symbols from the pre-morphed reels 130 may be said to be "replaced" by the higher-ranked of those two original symbols when the higher-ranked symbol is added onto the morphed reel 312. In other words, the symbol being added to the morphed reel 312 may be replacing either or both of the original symbols.

In some embodiments, game controller 202 may morph two or more adjacent reels 130 into a morphed reel 312 by replacing one or more sets of laterally adjacent symbols with at least one special metamorphic reel game symbol.

In some embodiments, first reel 308 and second reel 310 of the plurality of adjacent spinnable reels 130 may be morphed into single reel 314 while first reel 308 and second reel 310 are spinning at approximately equal speeds and may stop spinning as morphed reel 314. In other words, game controller 202 may synchronize the rotational speeds of the reels 308 and 310 and display an animation of the reels 308, 310 collapsing into merged reel 314 before the spinning stops. In some embodiments, reels 308 and 310 may spin a slower rate while morphing than in base game instance 307 so the player is able to visually witness the details of the morphing process, thereby providing enhanced excitement and understanding of the morphing process.

Game symbols used in determining game outcomes are displayed in the plurality of adjacent game symbol positions 408 in a one-to-one correspondence. In some other embodiments, more than one game symbols are displayed in at least one of the plurality of adjacent game symbol positions.

Figure 4:
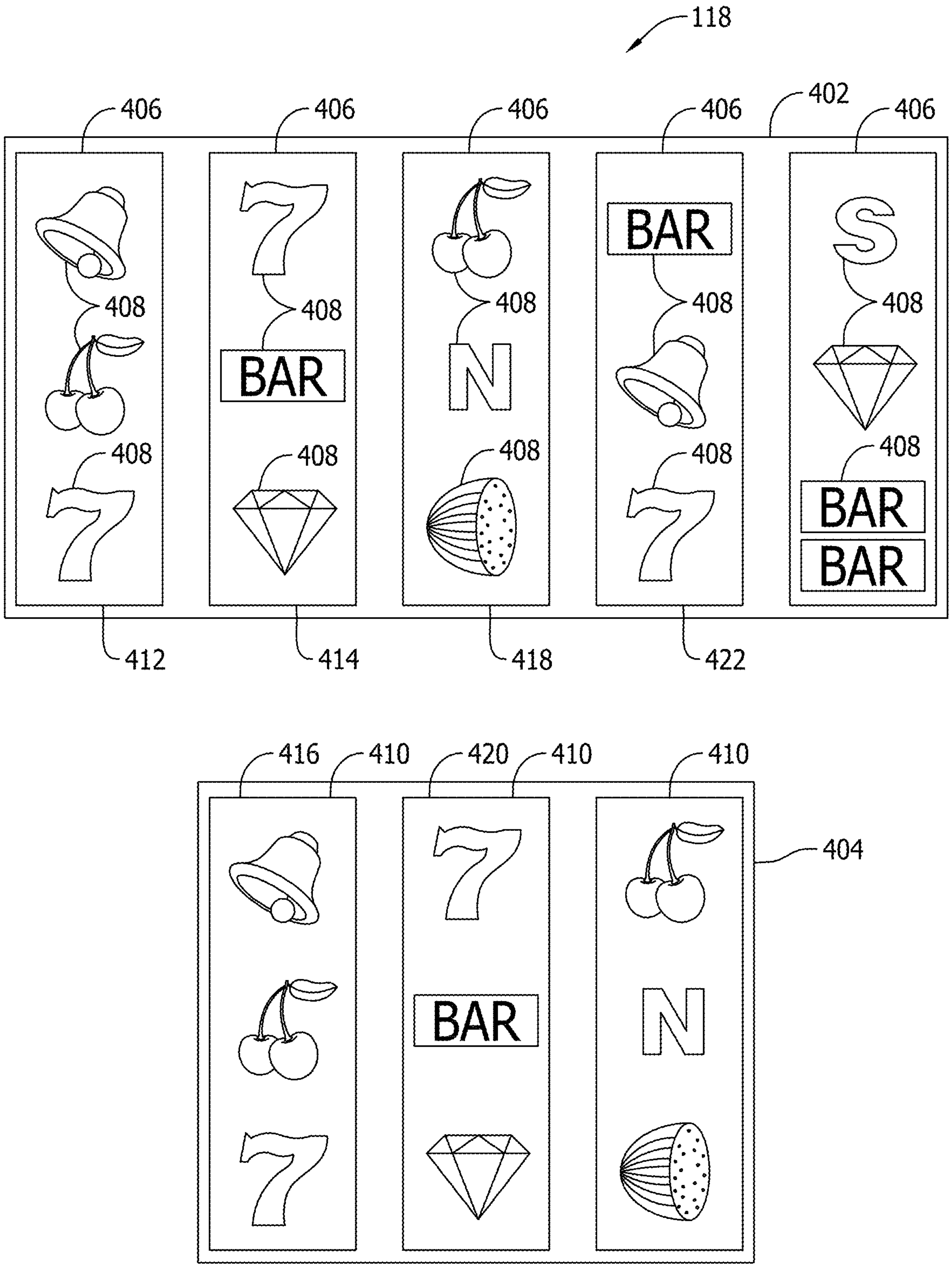
FIG. 4 is a front view of the gaming display area shown in FIG. 1 in the first base game condition and in a second metamorphic reel game condition.

FIG. 4 is a front view of gaming display area 118 in a base game instance 402 and in a metamorphic reel game instance 404. In some embodiments, base game instance 402 may be similar to base game instance 307, and metamorphic game instance 404 may be similar to metamorphic game instance 309. As used herein, a metamorphic reel game is a slot-type wagering game where, during play of a base game, a metamorphic feature is initiated (e.g., randomly, or upon occurrence of a triggering condition). The metamorphic feature transitions from a multi-reel base game to a metamorphic reel game where the number of reels has been reduced and a metamorphic reel game paytable is used (e.g., based on the remaining number of reels). In the example embodiment, five laterally adjacent reels 406 are displayed. Each reel 406 has a plurality of circumferentially adjacent game symbol positions 408. This example configuration of reels 406 and game symbol positions 408 is associated with a five-reel paytable stored in one or more memory devices 208 communicatively coupled to one or more processors 204. After initiation of the metamorphic reel game, the initial five reels transition to a lesser number of reels and the metamorphic reel game paytable is used.

In the example embodiment, five reels 406 have been reduced to three metamorphic reel game reels 410. Reducing the five reels 406 to three reels 410 is accomplished by morphing two or more reels 406 into a lesser number of reels 410. In the example embodiment, the two leftmost reels 412 and 414 in base game instance 402, referred to as morphing reels, have been morphed into a single leftmost reel 416 in metamorphic reel game instance 404 and referred to as a morphed reel. In other embodiments, any two or more reels 406 may be morphed into any lesser number of reels 410. For example, reels 414 and a reel 418 may be morphed into a single morphed reel 420. Additionally, reels 414, 418, and a reel 422 may be morphed into two morphed reels, for example, reels 416 and 420, or reels 414, 418, and a reel 422 may be morphed into a single morphed reel, for example, reel 420. In various embodiments, the morphing process is accomplished in any of a plurality different ways as described in detail below. While no symbols are shown in metamorphic game instance 404, it should be understood that morphed reels 410 are created (e.g., populated with symbols) by game controller 202 based on one of the morphing processes described herein.

In the example embodiment, the metamorphic feature is triggered randomly (e.g., based on a result of a random number generator). In some embodiments, the metamorphic feature may be triggered based the result of a stopped reel 406 (e.g., as a trigger condition). For example, during a spin, some reels 406 may stop while other reels 406 continue to spin. The metamorphic feature may be triggered based on the occurrence of a particular symbol (e.g., one or more triggering symbols, such as three "coins") on the stopped reel 406. As such, two reels 406 that are still spinning may be merged based on the occurrence of the triggering symbol on the stopped reel 406. In some embodiments, the metamorphic feature may be triggered based on the result of a previous spin. For example, if the triggering symbol appears in a first spin (e.g., without having activated the morphing feature), then the metamorphic feature may be triggered during a second spin. The player may be subject to an additional wager to activate the metamorphic feature in the second spin, or the metamorphic feature may be granted in the second spin during a free spin.

Figure 5:
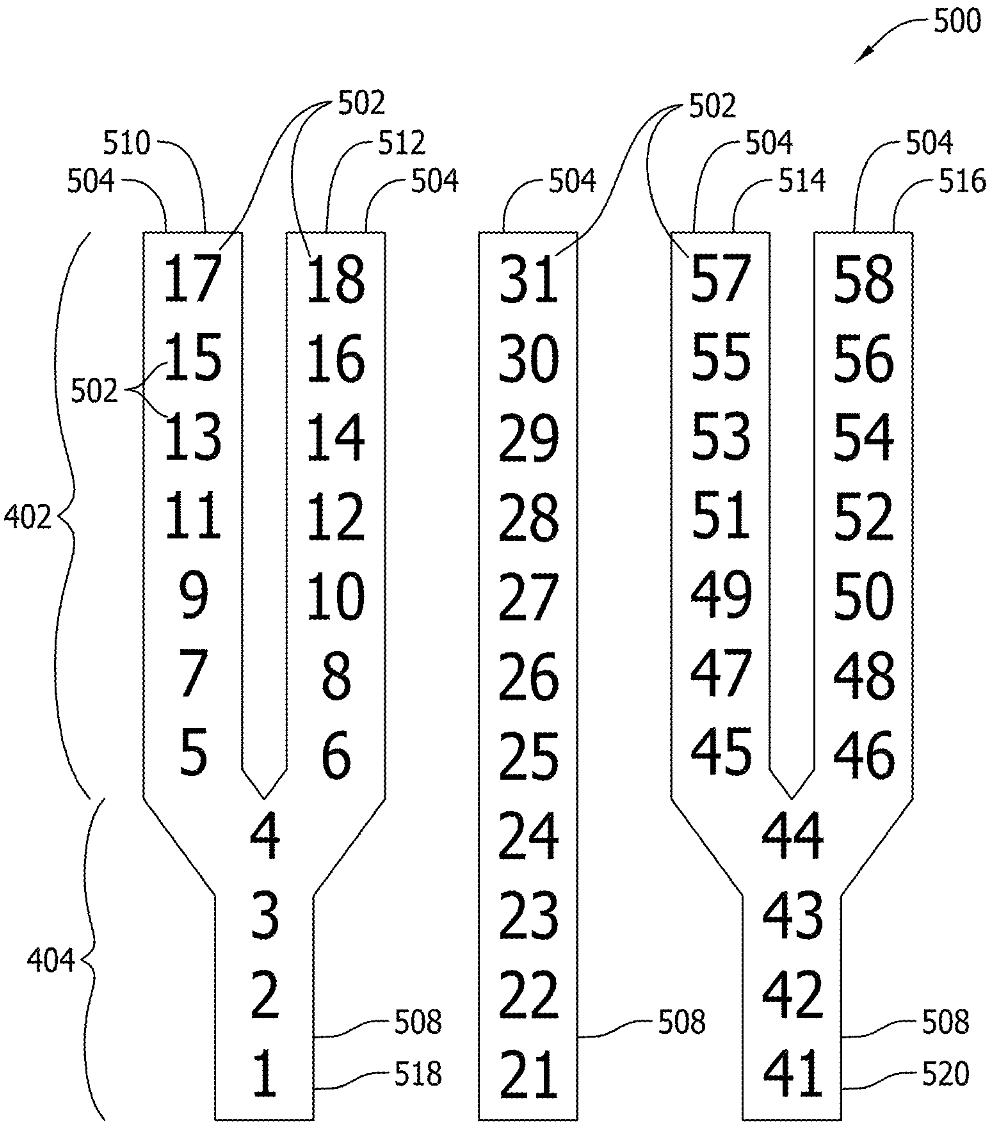
FIG. 5 is a view illustrating an alternating symbol morphing process.

FIG. 5 is a view illustrating an alternating symbol morphing process. In the example embodiment, a symbol pattern 500 of multiple game symbols 502 are displayed on multiple game symbol strips 504 that correspond to symbols 408 on reels 406. In base game instance 402 or prior to the morphing process in a metamorphic reel game, symbol pattern 500 includes, for example, five game symbol strips 504. In metamorphic reel game instance 404, symbol pattern 500 includes, for example, three game symbol strips 508. During the morphing process, symbols 502 from a pair of morphing strips 510 and 512, or 514 and 516 are combined into morphed strips 518 and 520, respectively. The morphing process alternates game symbols 502 from each associated strip 510 and 512, or 514 and 516 in each pair of strips to form morphed strip 518 or 520. The alternating symbol morphing process is sometimes referred to as a "zipper" merge, or interdigitating, because game symbols 502 alternate in morphed strips 518 and 520 similar to the teeth on a zipper.

In the example shown in FIG. 5, morphing strip 510 includes the odd numbers between 1 and 17, and morphing strip 512 includes the even numbers between 2 and 18. When creating morphed strip 518, game controller 202 selects symbols 502 from each separate morphing strip 510, 512 in an alternating fashion. For example, "1" is added to morphed strip 518 from morphing strip 510, "2" is added to morphed strip 518 from morphing strip 512, "3" is added to morphed strip 518 from morphing strip 510, "4" is added to morphed strip 518 from morphing strip 512, and so forth. As such, all of the symbols 502 from both morphing strips 510, 512 are used in morphed strip 518. In other examples, more morphing strips may be similarly combined, alternating between each of the morphing strips to create the symbols 502 appearing on the morphed strip. For purposes of illustration, FIG. 5 illustrates a partially morphed section 404 of morphed strip 518 (e.g., with "1" through "4" already added to morphed strip 518) and remaining unmorphed sections 402 of morphing strips 510 and 512 (e.g., with "5" through "17" on morphing strip 510 and "6" through "18" on morphing strip 512).

Figure 6:
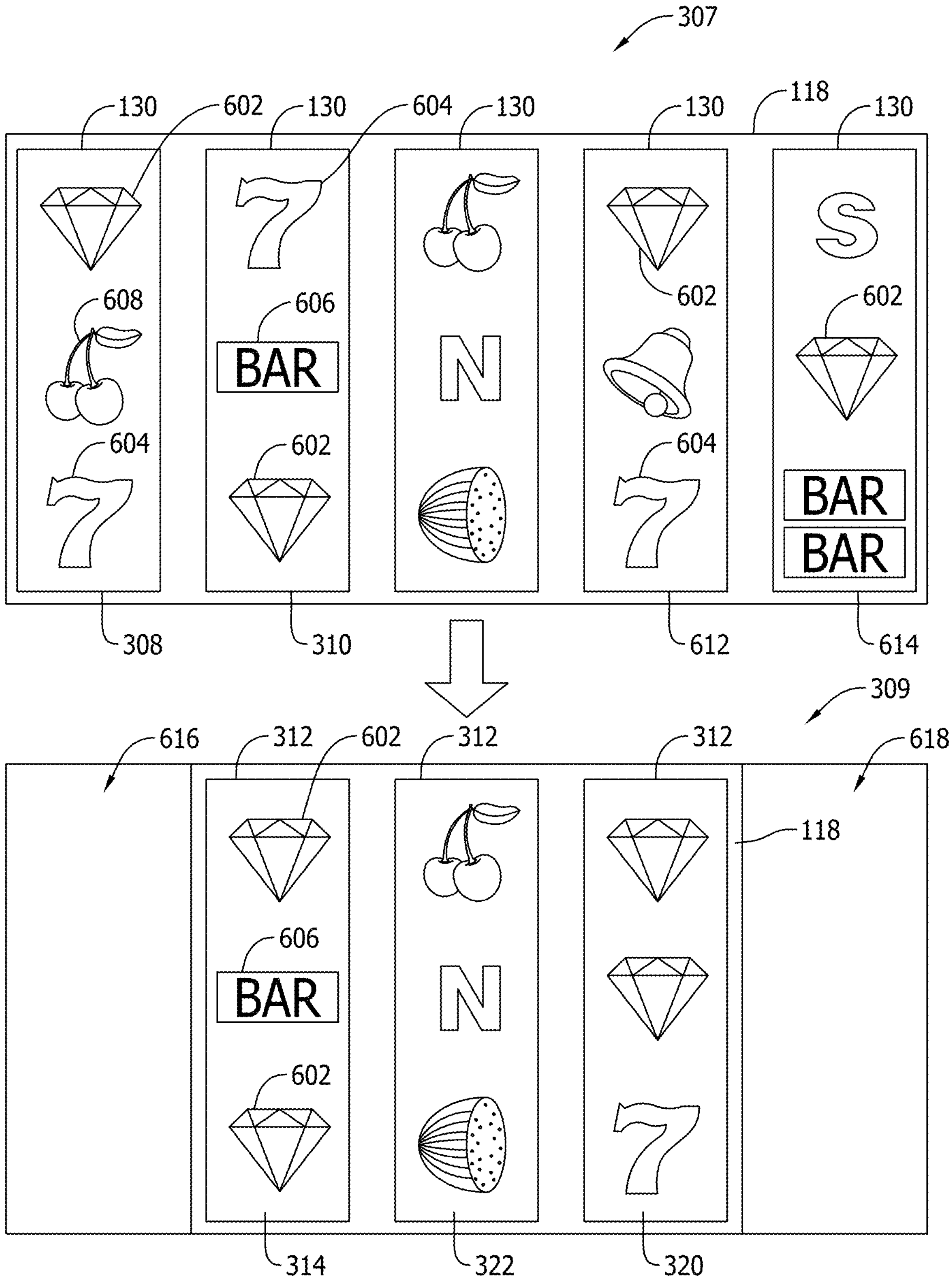
FIG. 6 is a view of the gaming display area shown in FIG. 1 illustrating a symbol rank-based morphing process.

FIG. 6 is a view of gaming display area 118 illustrating the symbol rank-based morphing process described above in reference to FIG. 3. In the example embodiment, game symbols 304 on morphing reel 308 that are of superior rank to a laterally adjacent game symbol 304 on morphing reel 310 becomes the game symbol 304 on morphed reel 312. In the example embodiment, a diamond symbol 602 and a "7" symbol 604 are laterally adjacent at the top position of morphing reel 308 and morphing reel 310, respectively. In this example, diamond symbol 602 has a superior rank to "7" symbol 604. Consequently, diamond symbol 602 is positioned at the top position on morphed reel 314 as it supersedes "7" symbol 604. In this example, a bar symbol 606 out ranks a cherry symbol 608, so similarly, bar symbol 606 is positioned in the middle position on morphed reel 314. Again, as is shown in the bottom position of morphing reel 308 and morphing reel 310, diamond symbol 602 outranks "7" symbol 604, so diamond symbol 602 is placed in the bottom position on morphed reel 314. A center reel 610 is unmorphed in this example, so it is unchanged in second instance 309 from first instance 307. Morphing reels 612 and 614, in this example, yields morphed reel 320. Diamond symbols 602 and "7" symbol 604 each outrank their adjacent symbol illustrated in reels 612 and 614 resulting in diamond symbols 602 in the top and middle positions of reel 320 and "7" symbol 604 in the bottom position. A three reel paytable stored in memory 208 is used to determine an award to be credited to the player's account.

In some embodiments, game symbols 408 may be combined during the morphing process. In one embodiment, identical game symbols 408 may be combined together during the morphing process. For example, when identical game symbols 408 are laterally adjacent to each other on two reels that are to be morphed together, or otherwise would end up adjacent to each other on the morphed reel, the morphing process may combine those identical game symbols 408 into a double symbol (e.g., two diamonds combining into a "2×" diamond). Similarly, two adjacent "2×" diamonds may be combined into a "4×" diamond during the morphing process. For another example, two top box wheel spin symbols may combine during the merging process to award the player with two free spins. In another embodiment, some non-identical but related game symbols 408 may be combined during the morphing process. For example, a diamond and a "2×" diamond may be combined into a "3×" diamond during the morphing process (e.g., related based on the underlying symbol, diamond). For another example, an Ace being adjacent to a Jack may be combined, during the merging process, to generate a "Blackjack" symbol on the merged reel. In some embodiments, not all identical game symbols 408 are combined during the morphing process, even if they are adjacent. For example, diamonds may be identified as combinable, and cherries may not be combinable. As such, adjacent diamonds may be combined during the morphing process, where adjacent cherries will not be combined. Adjacency between two symbols may include the two symbols being laterally adjacent to each other on two reels that are to be merged (e.g., laterally adjacent before merging) and two symbols being adjacent to each other on the merged reel (e.g., during or after the merging).

After the morphing process from a five reel game to a three reel game, a space 616 and a space 618 are made available on gaming display area 118. Spaces 616 and 618 may be used to display additional information, instructions, graphics, or combinations thereof to the player. Alternatively, a width of reels 314, 322, and 320 may be increased to fill the available spaces 616 and 618.

The metamorphic feature may include a visual display highlighting the morphing process. For example, in some embodiments, if the metamorphic feature involves dropping lower-ranked symbols in favor of higher-ranked symbols, a higher-ranked symbol may be displayed as bumping or pushing a lower-ranked symbol off of the merged reel, "squishing" the lower-ranked symbol, or ghosting the higher-ranked symbol over the lower-ranked symbol and fading away the lower-ranked symbol. In some embodiments, combining two symbols may be displayed as squeezing two individual symbols together to generate a combined symbol (e.g., two diamonds pressing together to form a "2×" diamond, perhaps with a fluid morphing effect). Such visual display may provide heightened excitement to the player, and may serve to illustrate the priority of certain symbols over others.

In some embodiments, the metamorphic feature may include replicating one or more morphed reels 312 (e.g., after two reels 130 have been morphed into a morphed reel 312). For example, after morphing reels 308 and 310 to form morphed reel 314, morphed reel 314 may be duplicated and be presented as a fourth reel 312 (not shown in FIG. 6) in the metamorphic game instance 309 (e.g., to the right of morphed reel 314, between morphed reel 314 and unmorphed reel 322. In some embodiments, both morphed reels 314 and 320 may be replicated as such, thereby changing the metamorphic game instance 309 back to a five reel game.

Figure 7:
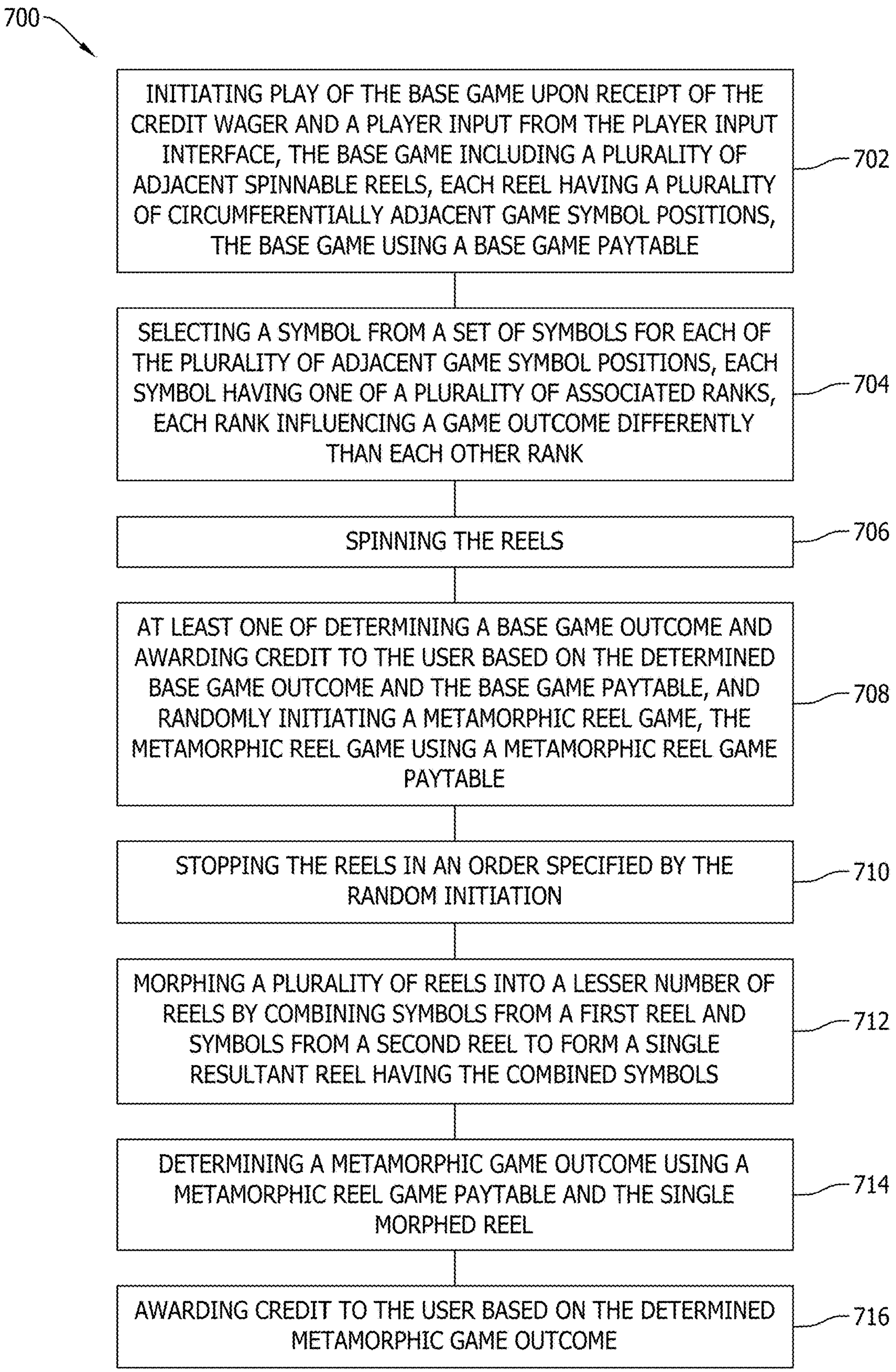
FIG. 7 is a flow chart of a method of electronic gaming implemented using a gaming device.

FIG. 7 is a flow chart of a method 700 of electronic gaming implemented using a gaming device. The gaming device includes a main display configured to display a wagering game, a player input interface, a credit input mechanism including at least one of a ticket reader, a bill validator, and a coin input mechanism. The credit input mechanism is configured to establish a credit balance that is increasable and decreasable based on wagering activity. The gaming device also includes one or more tangible, non-transitory, computer-readable memory devices, and one or more processors communicatively coupled to the one or more memory devices. The method includes initiating play of the base game upon receipt of the credit wager and a player input from the player input interface. The base game, or primary game, includes a plurality of adjacent spinnable reels. Each reel has a plurality of circumferentially adjacent game symbol positions, the base game using a base game paytable. Method 700 also includes spinning 704 the reels (e.g., five primary game reels). In this example embodiment, reels 2, 3, and 4 spin and are stopped at operation 706. At test 708, method 700 includes determining whether to initiate a metamorphic game (e.g., transition the primary game into a game with morphing reels). If the metamorphic game is not initiated, then method 700 may include stopping reel 5 and then reel 1 at operation 710, determining a game outcome via a right to left evaluation of a five reel pay table at operation 712, and awarding credit to the player based on the game outcome (e.g., based on the 5 primary game reels).

If the metamorphic game is initiated at test 708, then the primary game transitions 720 to a metamorphic game with reels 1 and 5 still spinning The metamorphic reel game is thus initiated, and uses a metamorphic reel game paytable (e.g., with a reduced number of reels). Method 700 also includes morphing a plurality of reels (e.g., the five primary game reels) into a lesser number of reels by combining symbols from a first reel and symbols from a second reel to form a single resultant reel having the combined symbols. In the example embodiment, morphing the reels includes slowing the spinning speed of reels 1 and 5 at operation 722 and accelerating the spinning of reels 2 and 4 to match the speed of reels 1 and 5 at operation 724. Method 700 then includes, at operation 726, merging reel 1 and reel 2 into a morphed reel 1 that is displayed to the left of primary game reel 3. Further, method 700 includes, at operation 728, merging reels 4 and 5 into a morphed reel 3 that is displayed to the right of primary game reel 3. As such, the metamorphic game then includes morphed reel 1, the original primary game reel 3, and morphed reel 3, left to right. At this stage, post-morphing, morphed reels 1 and 3 may continue to spin. As such, morphed reels 1 and 3 may then be stopped at operation 730. Method 700 further includes determining a metamorphic reel game outcome using a metamorphic reel game paytable (e.g., a three reel pay table) and the morphed reel(s) at operation 732 and awarding 714 credit to the player based on the determined metamorphic reel game outcome.

Optionally, method 700 includes stopping the reels in the order specified by the initiation, if a rightmost or leftmost reel stops first, determine a base game outcome based on a base game paytable and a payline that starts with the reel that stopped first, if an interior reel between the rightmost and leftmost reels stops first, enter a metamorphic reel game wherein the game controller morphs a plurality of reels of the plurality of adjacent spinnable reels into a single reel. Also optionally, method 700 may include morphing a plurality of reels into a lesser number of reels by interdigitating game symbols from each of the morphing reels alternately to form the single morphed reel. Also optionally, method 700 may include morphing a plurality of reels into a lesser number of reels by aligning game symbol positions on a first morphing reel with game symbol positions on a second morphing reel, and replacing a lower ranked game symbol from either morphing reel with a higher ranked game symbol from the other morphing reel. Morphing a plurality of reels into a lesser number of reels may include morphing five reels into three reels. Also optionally, method 700 may include receiving an output from a random number generator corresponding to a metamorphic reel game initiation condition. Also optionally, method 700 may include replicating the morphed reel, thereby adding an additional morphed reel to the metamorphic reel game prior to determining the metamorphic reel game outcome.

As used herein, "to receive a physical item representing a monetary value" not only includes physical items that enter a credit input mechanism of a gaming device, but also to physical items brought proximate to the gaming device for communications between the physical item and the gaming device.

As used herein, "spinnable reels" refer to physical reels and to virtual reels that appear to spin when viewed on a screen of a display, such as, but not limited to primary game display 240 and/or secondary game display 242.

As used herein, "morph" and "morphing" with respect to an individual image or symbol refers to the image or symbol changing smoothly from one image or symbol to another by small gradual steps using computer animation techniques. With respect to reels, "morphing" may comprise merging the symbols from a plurality of reels by alternating symbols from each reel onto the resultant reel (zipper merge), by replacing lower ranking symbols from one reel with higher ranking symbols from another reel, fading certain symbols from each merging reel to create blank symbol positions on each reel and then mesh the reels together using the remaining filled symbol positions similar to teeth on a pair of interlocking gears.

As used herein, "zipper merge" refers to a convention for merging a plurality of symbols on adjacent reels to a reduced number of adjacent reels. Symbols on merging reels alternate entering a resultant reel at a reel reduction point to effect the merge at that location.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:

a game controller; and a memory device storing instructions, which when executed by the game controller cause the game controller, to at least:

initiate a first round of play upon receipt of a player input, thereby causing a simulated spinning of a plurality of adjacent spinnable reels, each spinnable reel having a plurality of rows of game symbol positions on the reel for displaying a symbol within an associated game symbol position, the plurality of adjacent spinnable reels including at least a first spinnable reel and a second spinnable reel;

change to a metamorphic reel game for the first round of play;

generate a morphed reel by interdigitating symbols on the first spinnable reel and the second spinnable reel, wherein symbols on the morphed reel are ordered in respective symbol positions of the morphed reel by alternating symbols from the first spinnable reel and the second spinnable reel; and replace the first spinnable reel and the second spinnable reel with the morphed reel in the metamorphic reel game.

2. The gaming system of claim 1, wherein replacing the first spinnable reel and the second spinnable reel with the morphed reel reduces the number of adjacent spinnable reels in the metamorphic reel game.

3. The gaming system of claim 2, wherein the instructions further cause the game controller to determine a game outcome associated with the reduced number of reels that includes the morphed reel.

4. The gaming system of claim 1, wherein the change to the metamorphic reel game is based on a received output from a random number generator.

5. The gaming system of claim 1, wherein interdigitating symbols on the first spinnable reel and the second spinnable reel includes:

adding a first symbol from a first row of the first spinnable reel to a first row of the morphed reel; and adding a second symbol from a first row of the second spinnable reel to a second row of the morphed reel.

6. The gaming system of claim 5, wherein interdigitating symbols on the first spinnable reel and the second spinnable reel further includes:

adding a third symbol from a second row of the first spinnable reel to a third row of the morphed reel, wherein the second row of the morphed reel is directly adjacent to the first row and the third row of the morphed reel.

7. The gaming system of claim 1, further comprising: a player input interface configured to receive a player input, and a credit input device including at least one of a ticket reader, a bill acceptor, a wireless receiver, and a coin input mechanism, the credit input device configured to receive a physical item or input signal representing a monetary value for establishing a credit balance used for the credit wager, and wherein the game controller is communicatively coupled to the player input interface and the credit input device.

8. The gaming system of claim 1, wherein the plurality of adjacent spinnable reels includes five adjacent spinnable reels, wherein the instructions further cause the game controller to form two morphed reels from two respective pairs of the five adjacent spinnable reels to form the metamorphic reel game as a three-reel metamorphic reel game.

9. The gaming system of claim 1, wherein the instructions further cause the game controller to morph four reels of the plurality of adjacent spinnable reels into two separate morphed reels when changing to the metamorphic reel game.

10. The gaming system of claim 1, wherein game symbols are displayed in the plurality of rows of game symbol positions in a one-to-one correspondence.

11. The gaming system of claim 1, wherein more than one game symbol is displayed in at least one of the plurality of rows of game symbol positions.

12. The gaming system of claim 1, wherein the replacing the first spinnable reel and the second spinnable reel with the morphed reel includes displaying the first and second spinnable reels merging together while spinning.

13. The gaming system of claim 1, wherein a received output from a random number generator is used to determine whether a triggering condition of the metamorphic reel is met, the triggering condition being at least one of: a result of a stopped reel, a stopped reel of the spinnable reels displaying a special symbol, and an order for stopping the plurality of spinnable reels.

14. The gaming system of claim 13, wherein the triggering condition comprises an order for stopping the plurality of spinnable reels, wherein at least one of the first and second spinnable reels is an interior reel of the plurality of reels, and wherein the triggering condition is met when one of the interior reels of the plurality of reels is the first stopped reel.

15. A non-transitory computer-readable storage medium having computer-executable instructions embodied thereon, wherein when executed by at least one processor, the computer-executable instructions cause the processor to:

initiate a first round of play upon receipt of a player input, thereby causing a simulated spinning of a plurality of adjacent spinnable reels, each spinnable reel having a plurality of rows of game symbol positions on the reel for displaying a symbol within an associated game symbol position, the plurality of adjacent spinnable reels including at least a first spinnable reel and a second spinnable reel;

change to a metamorphic reel game for the first round of play;

generate a morphed reel by interdigitating symbols on the first spinnable reel and the second spinnable reel, wherein symbols on the morphed reel are ordered in respective symbol positions of the morphed reel by alternating symbols from the first spinnable reel and the second spinnable reel; and replace the first spinnable reel and the second spinnable reel with the morphed reel in the metamorphic reel game.

16. The non-transitory computer-readable storage medium of claim 15, wherein replacing the first spinnable reel and the second spinnable reel with the morphed reel reduces the number of adjacent spinnable reels in the metamorphic reel game.

17. The non-transitory computer-readable storage medium of claim 16, wherein the instructions further cause the processor to determine a game outcome associated with the reduced number of reels that includes the morphed reel.

18. The non-transitory computer-readable storage medium of claim 15, wherein interdigitating symbols on the first spinnable reel and the second spinnable reel includes:

adding a first symbol from a first row of the first spinnable reel to a first row of the morphed reel; and adding a second symbol from a first row of the second spinnable reel to a second row of the morphed reel.

19. The non-transitory computer-readable storage medium of claim 18, wherein interdigitating symbols on the first spinnable reel and the second spinnable reel further includes:

adding a third symbol from a second row of the first spinnable reel to a third row of the morphed reel, wherein the second row of the morphed reel is directly adjacent to the first row and the third row of the morphed reel.

20. A method of electronic gaming implemented using a gaming system, the gaming system including a main display configured to display a game that includes a plurality of adjacent spinnable reels, a player input interface, one or more memory devices, and one or more processors communicatively coupled to the one or more memory devices, the method comprising:

initiating a first round of play upon receipt of an input from the player input interface;

simulating a spinning of the adjacent spinnable reels, each of the adjacent spinnable reels being virtual and having a plurality of rows of game symbol positions for displaying a symbol within an associated game symbol position, the plurality of adjacent spinnable reels including a first spinnable reel and a second spinnable reel;

changing to a metamorphic reel game for the first round of play;

generating a morphed reel by interdigitating symbols on the first spinnable reel and the second spinnable reel, wherein symbols on the morphed reel are ordered in respective symbol positions of the morphed reel by alternating symbols from the first spinnable reel and the second spinnable reel; and replacing the first spinnable reel and the second spinnable reel with the morphed reel in the metamorphic reel game.

* * * * *